Aug. 21, 1928.
O. L. COMPTON
1,681,518
AUTOMOBILE SAFETY BRAKE EQUALIZER
Filed March 31, 1927
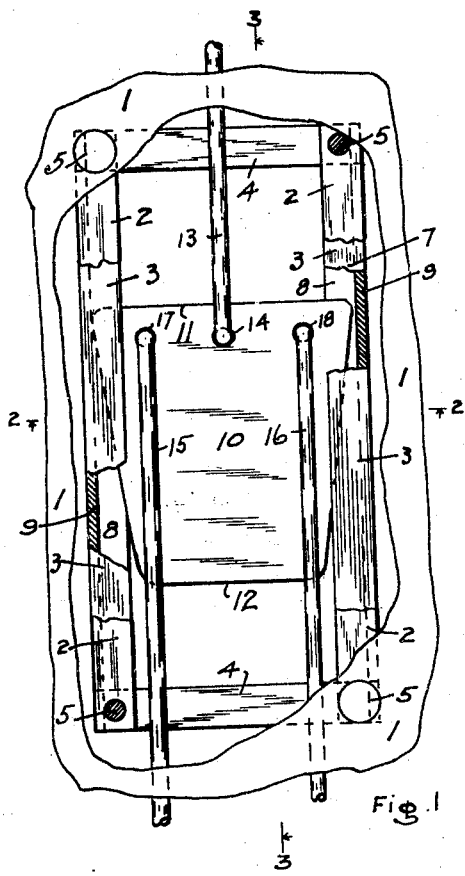
Fig. 1.
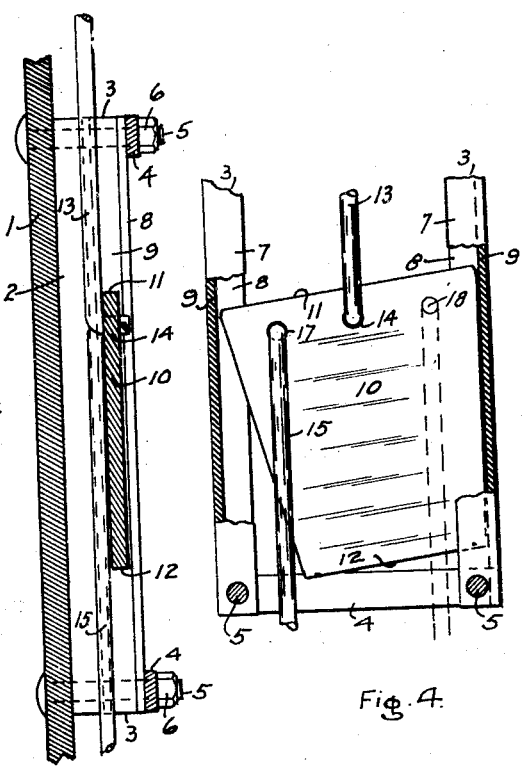
Fig. 3.
Fig. 4.
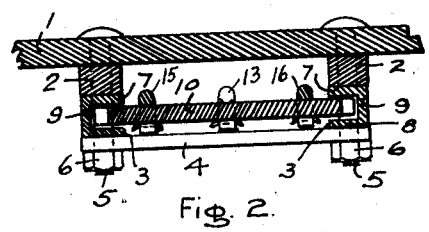
Fig. 2.
Inventor
Otto L. Compton
By
Attorney Patented Aug. 21, 1928.

1,681,518

UNITED STATES PATENT OFFICE.

OTTO L. COMPTON, OF OLYMPIA, WASHINGTON.

AUTOMOBILE SAFETY BRAKE EQUALIZER.

Application filed March 31, 1927. Serial No. 179,846.

This invention relates to mechanism interposed between the single brake lever, or other brake-applying means, and the two or more brake-bands, shoes or other friction means which are applied to the wheels or other turning part. It has for its objects, first, to provide means whereby the force applied to the single brake lever will be equally applied to both the brakes, independent of the wear thereon; second, to provide means whereby if the brake-applying mechanism for one of the brakes becomes inactive through breakage of some part or because some connection or joint has become disconnected, then the braking force is applied fully to the other brake; and third, to provide means for guiding the equalizer in its motion and to prevent any rattling of the parts when not under strain. Further objects are to provide a mechanism of extreme simplicity; which is cheap to make, easy to apply, and effective in use.

I attain these and other objects by the devices, mechanisms, and arrangements illustrated in the accompanying drawings, in which—

Fig. 1 is a plan view of my improved equalizer, showing the automobile floor broken away to reveal the mechanism; Fig. 2 is a vertical cross-section thereof, taken on the line 2—2 in Fig. 1; Fig. 3 is a longitudinal section thereof, taken on the line 3—3 in Fig 1; and Fig. 4 is a plan of a part of the mechanism, showing the relative positions of the parts when one brake rod is removed or is inactive for any reason.

Similar numerals of reference refer to similar parts throughout the several views.

Referring to the drawings, it will be seen that I have illustrated only that part of the braking apparatus of an automobile to which my invention is applied, the brake lever and the brakes themselves not being shown therein.

The floor 1 of the automobile is provided on its under side with two longitudinal rails 2, preferably of wood, and two guide channels 3 are mounted immediately below the said rails 2. A strap 4 extends across each end of the frame formed by the guide channels 3, said straps 4 being mounted below the said channels. Four bolts 5 pass vertically down through the floor 1, the ends of the rails 2, guide channels 3 and straps 4, and are provided with securing nuts 6 on their lower ends, whereby the frame thus formed is securely clamped together and held up in position against the lower side of the floor 1. It will be understood that the channels 3 are parallel and preferably lie parallel with the axis of the car. Each channel 3 comprises a U-shaped metal bar and they are placed on their sides in such manner that the grooves between the sides are facing each other and cooperate to form the equalizer guide. The upper walls 7 and the lower walls 8 of each such guide channel 3, are adapted to receive the equalizer between them and to control its motion, vertically, so that it will not rattle and yet will be free to move therealong. The outer walls 9 of the said guide channels are adapted to prevent lateral motion of the equalizer as well as to receive the side component of the braking forces when one brake has been disabled (Fig. 4). The guide channels 3 therefore permit only a longitudinal motion of the equalizer therein, when in normal action, together with a slight rotary motion therein, as hereinafter described.

The equalizer comprises a plate 10 whose width at its forward edge 11 closely fits between the outer walls 9 of the guides 3 and whose thickness fits closely between the walls 7 and 8 of the respective guides. The plate 10 is trapezoidal in form, its rear edge 12 being parallel with and shorter than its forward edge 11, and its central longitudinal axis being at right angles to said front and rear edges.

The brake rod 13, which is connected at its forward end to a brake lever, or other suitable apparatus, is bent down at right angles, at its end, and passes through a hole 14 in the plate 10, said hole 14 being on the central longitudinal axis of the plate 10 and near its front edge 11. The brake rods 15 and 16, which lead to the two brakes of the car, are similarly bent down at their ends and pass through holes 17 and 18, respectively, said holes being positioned symmetrically on each side of the hole 14 and near the front edge 11.

Thus it will be seen that when the rod 13 is pulled by the brake lever, it will pull the plate 10 and slide it within the guides 3, and that the stress or force therein will be equally divided between the two rods 15 and 16 leading to the brakes. Also, if one brake is looser than the other, then the plate 10 will turn slightly on the bent end of the rod 13 and permit one rod 15 to reach further forward than the other rod 16 until the forces applied therein are equalized, because the rear edge 12 is of less width than the space between the walls 9 of the guides 3 and therefore permits of a free but limited motion of the plate 10 about the said rod 13. But, if one brake is disabled, then the plate 10 turns on the end of the rod 13 until the rear corner, on the disabled side, engages the wall 9 and this wall 9 then provides the lateral component of the forces necessary to permit the braking force to be transmitted from the rod 13 to the remaining rod 15. By referring to Fig. 4 it will be seen that, in this latter case, the rod 15 has not been allowed to swing back of its normal relative position an excessive amount and therefore the remaining brake will be operated substantially without any difference from under normal conditions.

Having described my invention, what I claim is:—

In an equalizing apparatus, the combination of fixed parallel guiding means; a symmetrical trapezoidal equalizer plate mounted in said guiding means and free to move longitudinally therein; a central brake rod attached to the equalizer plate on its central axis and near its longer parallel edge; two lateral brake rods attached to said equalizer plate on each side of said central brake rod; and limiting means, comprising a part of said parallel guiding means, and permitting a free turning movement of the equalizer plate about said central brake rod connection in the normal operation of the brakes, but preventing an abnormal turning movement thereof by the engagement of one of the corners of the shorter parallel side of said equalizer plate therewith, thereby providing a lateral component of the braking forces whereby the force applied to the central brake rod is transmitted to one of the lateral brake rods when the other brake rod is inactive without permitting said remaining brake rod to be materially slackened.

OTTO L. COMPTON.